July 17, 1923.
C. H. BROWN
FISHING TOOL
Filed Oct. 29, 1921
1,462,099
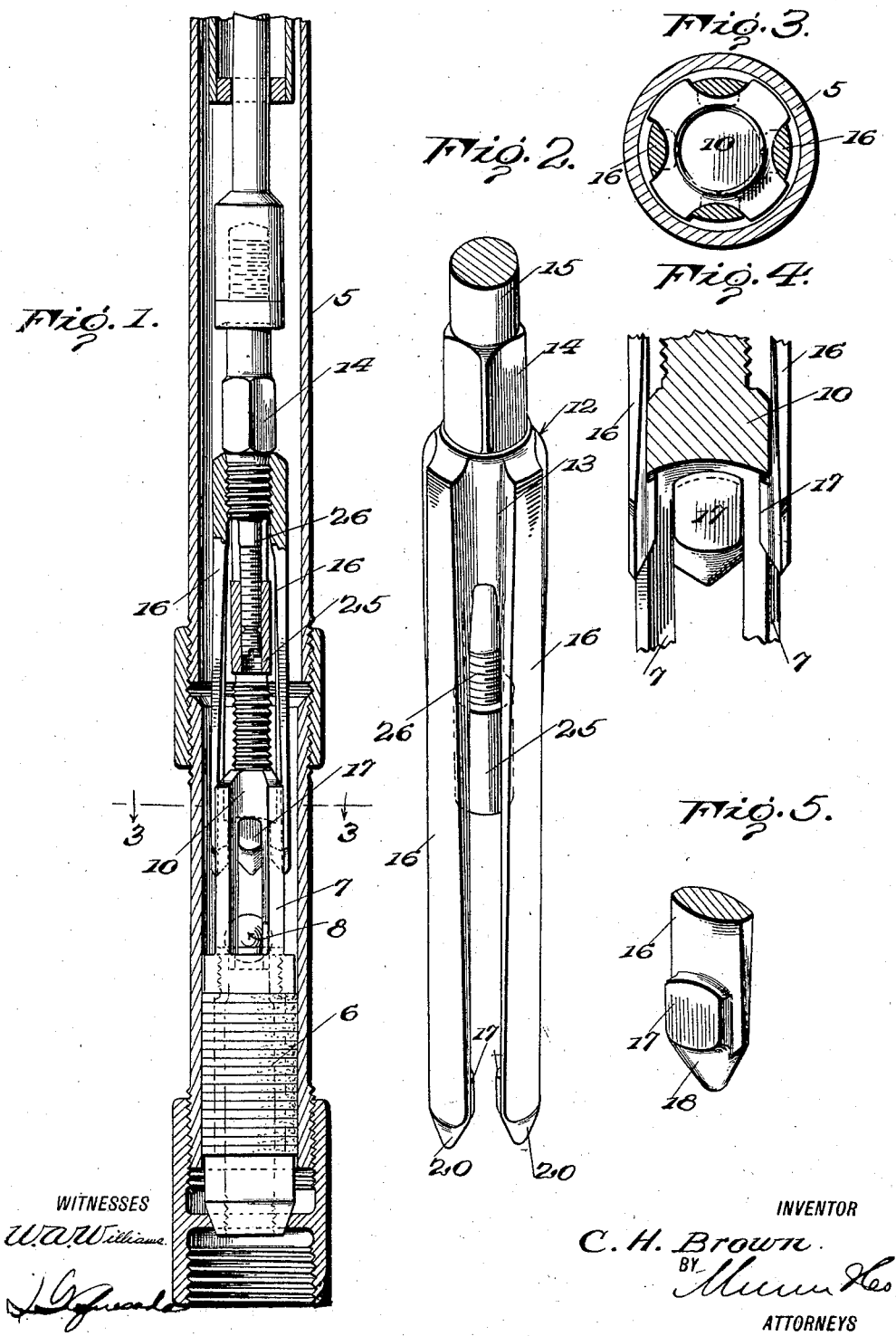
WITNESSES
INVENTOR
C. H. Brown
BY
ATTORNEYS Patented July 17, 1923.

1,462,099

UNITED STATES PATENT OFFICE.

CHARLES H. BROWN, OF BRECKENRIDGE, TEXAS.

FISHING TOOL.

Application filed October 29, 1921. Serial No. 511,366.

*To all whom it may concern:*

Be it known that I, CHARLES H. BROWN, a citizen of the United States, and resident of Breckenridge, in the county of Stephens and State of Texas, have invented certain new and useful Improvements in Fishing Tools, of which the following is a specification.

This invention relates to fishing tools or grapples especially adapted for use in connection with oil and other wells.

Briefly stated, an important object of this invention is to provide a grapple or fishing tool of the class described having novel means whereby the same may be engaged with the foot valve of an oil well for the purpose of removing the valve.

Another object of the invention is to provide a fishing tool or grapple so constructed that the downward movement of the same upon being engaged with the valve is limited, whereby the spring arms which grip the valve are prevented from engaging the body of the valve and being broken thereby.

A further object of the invention is to provide a fishing tool for removing foot valves wherein the spring arms are so constructed that they are enabled to withstand the strain incident to use.

A further object is to provide a fishing tool of the class described which is of highly simplified construction, durable in use and cheap to manufacture.

Other objects and advantages of the invention will become apparent during the course of the following description.

In the accompanying drawing, forming a part of this application and in which like numerals are employed to designate like parts throughout the same, Figure 1 is a detail sectional view through a working barrel illustrating the use of the improved fishing tool, the fishing tool being shown partly in section.

Figure 2 is a perspective of the improved fishing tool.

Figure 3 is a horizontal sectional view taken on the line 3—3 of Figure 1.

Figure 4 is a detail vertical sectional view illustrating the application of the improved fishing tool.

Figure 5 is a fragmentary perspective of a spring arm embodied in the invention, the view illustrating one of the barbs for engaging the valve.

In drawing wherein for the purpose of illustration is shown a preferred embodiment of the invention, the numeral 5 generally designates a working barrel having a foot valve 6 which as is well known is provided with a cage 7 within which a ball 8 is arranged. The cage which is designated by the numeral 7 consists of a plurality of spaced members or arms which define slots and the upper ends of the said arms are connected to a head 10 which as usual is interiorly screw threaded for engagement with the pump rod.

The tool forming the subject matter of this application is generally designated by the numeral 12 and consists of a head 13 having a squared portion 14 adapted to be engaged by the jaws of a wrench whereby the shank 15 may be threaded into a supporting means. As illustrated in Figure 2 the head 13 is provided with a plurality of forwardly directed spring arms 16 which slightly decrease in thickness toward their forward ends and which are provided at their forward ends with enlargements 17 adapted to be received within the elongated slot in the wall of the cage 7 so that the same may be engaged with the head 10 for removing the working valve 6. Specifically the forward ends of the arms 16 have their inner sides beveled as indicated at 18 and also tapered to a point so that when the same are engaged with the head 10 of the valve 7 the spring arms 16 will be spread and the barbs 17 will pass through the grooved portion of the head and extend into the slots in the valve cage. The inner faces of the barbs 17 are curved transversely as are the grooves in the head 10 so that when the barbs are extended into the said groove of the head 10 the outer faces of the arms 16 will not bind against the inner side of the working barrel 5. The outer faces of the spring arms 16 are also curved transversely so that the same may be of the maximum thickness and strength. In order that the arms 16 may be passed downwardly to the working barrel without interruption, the outer sides of the same have their forward ends beveled as indicated at 20 so that the same will not engage roughened places on the inner side of the working barrel, By having the outer sides of the arms 16 beveled at their forward ends as indicated at 20, the tool may move freely down through the working barrel 5 and engage with the cage 7. The vertical edges of the barb 17 are arranged inwardly of the vertical edges of the arms 16 so that the said barbs which are in the nature of thickened portions may enter the slots in the valve cage. When the barbs or thickened portions are received within the vertical slots in the valve cage 7 the outer faces of the arms are approximately flush with the outer face of the valve cage, as illustrated in Figure 3.

The downward movement of the tool is limited by means of a stop nut 25 threaded on a depending stem 26 formed integral with the head 13. The stop nut 25 is adjustable on the depending stem 26 and is so located that it will engage the rear end of the valve cage and thereby prevent the inwardly directed valve 17 from engaging the body of the working barrel 6 and breaking the arms 16. In other words the stop nut 25 which is adjustable prevents the forward ends of the arms 16 from engaging the forward end of the valve cage 7 and straining the arms 16 to the breaking point. With reference to Figure 5 it will be observed that the forward ends of the barbs 17 are also beveled to form continuations of the beveled faces 18.

In operation the tool is lowered into the well and the forward terminal portions of the arms 16 are passed over the head 10 through the grooves in the same and inwardly directed barbs 17 are received within the slots in the valve cage. The rear ends of the barbs are engaged with the head 10 so that when the tool is withdrawn the working valve 6 will also be withdrawn.

With reference to the foregoing description it will be seen that the forwardly extending spring arm completely surrounds the valve cage contact nut 25 and thereby protects the same. More specifically the arms 16 prevent the stop nut 25 from coming in contact with loose objects during the fishing operation. By reason of this construction the position of the stop nut 25 on the centrally arranged stem 26 cannot be accidentally changed and furthermore the threads on the stem 26 are prevented from being mutilated, through contact with loose objects during the descent of the tool or during the fishing operation.

Figure 4 illustrates that the arms 16 rearwardly of the barbs 17 flatly contact with the head 10 of the valve cage so that loose movement of the valve cage is prevented during its withdrawal from the well. That is to say as the opposite longitudinal edges of the barbs 17 are spaced inwardly of the longitudinal edges of the arms 16 as illustrated in Figure 5 the barbs may enter the space between the parts 7 and thereby permit the arms 15 to flatly contact with the head 10.

Having thus described my invention what I claim is:—

1. A fishing tool comprising a head having a plurality of forwardly directed arms provided with inwardly directed flat barbs adapted to be received within the slots of a valve cage, the forward terminal portions of said arms and said barbs being beveled whereby to spread the arms upon being engaged with the valve cage, and adjustable means to limit the forward movement of said arms, said adjustable means being rotated between and protected by said arms.

2. A tool for removing working valves from wells comprising a head having a plurality of forwardly directed arms having inwardly directed transversely curved enlargements constituting barbs, the longitudinal edges of said enlargements being arranged inwardly of the side edges of said arms whereby the barbs are snugly received within the slots of a valve cage, the terminal portions of said arms having their outer sides beveled, and adjustable means whereby to limit the movement of the arms onto an object, said adjustable means being surrounded and protected by said arms.

3. A tool for removing working valves from wells comprising a head having a plurality of forwardly directed arms gradually reduced in thickness toward their forward ends and having inwardly directed transversely curved enlargements constituting barbs, the longitudinal edges of said enlargements being arranged inwardly of the side edges of said arms whereby the barbs are snugly received within the slots of a valve cage, the terminal portions of said arms having their outer sides beveled, a stem carried by said head and arranged between and protected by said arms, and an adjustable stop nut threaded on said stem and adapted to engage said valve cage to limit the forward movement of the arms onto the valve cage.

4. A fishing tool for removing working barrels from wells comprising a head having a plurality of forwardly directed spring arms having barbs adapted to be received in the slots of a valve cage, a threaded stem depending from said head and arranged between said arms, and a stop nut threaded on said depending stem and arranged in line with the valve cage whereby to limit the movement of the arms onto the valve cage and to protect the arms, said stop nut being surrounded by and protected by said arms.

CHARLES H. BROWN.